United States Patent
Kumar et al.

(10) Patent No.: US 11,914,053 B2
(45) Date of Patent: Feb. 27, 2024

(54) VEHICLE LOCATION ACCURACY ENHANCEMENT SYSTEM

(71) Applicant: Honeywell International Inc., Charlotte, NC (US)

(72) Inventors: Perumal Kumar, Bangalore (IN); Sanjay Lenka, Bangalore (IN); Nagaraj Kanapur, Bengaluru (IN)

(73) Assignee: Honeywell International Inc., Charlotte, NC (US)

(*) Notice: Subject to any disclaimer, the term of this patent is extended or adjusted under 35 U.S.C. 154(b) by 128 days.

(21) Appl. No.: 17/190,675

(22) Filed: Mar. 3, 2021

(65) Prior Publication Data
US 2022/0221592 A1 Jul. 14, 2022

(30) Foreign Application Priority Data

Jan. 11, 2021 (IN) ............................. 202111001201

(51) Int. Cl.
*G01S 19/46* (2010.01)
*G01S 13/02* (2006.01)
(Continued)

(52) U.S. Cl.
CPC .............. *G01S 19/46* (2013.01); *G01S 13/86* (2013.01); *G01S 13/89* (2013.01); *G01S 13/935* (2020.01);
(Continued)

(58) Field of Classification Search
CPC ........... G01S 2013/0254; G01S 13/935; G01S 13/86; G01S 13/89; G01S 19/46; G01S 19/40; G01S 19/47
See application file for complete search history.

(56) References Cited

U.S. PATENT DOCUMENTS 6,281,832 B1 * 8/2001 McElreath ............ G01S 13/935
340/963
6,512,976 B1 1/2003 Sabatino et al.
(Continued)

FOREIGN PATENT DOCUMENTS

| CN | 102937449 B | 1/2015 |
| CN | 209446051 U | 9/2019 |
| CN | 106840203 B | 1/2020 |

OTHER PUBLICATIONS

"Performance Based Navigation PBN NAS Navigation Strategy 2016", Federal Aviation Administration, 2016, pp. 1 through 37, U.S. Department of Transportation.
(Continued)

*Primary Examiner* — Bernarr E Gregory
*Assistant Examiner* — Hailey R Le
(74) *Attorney, Agent, or Firm* — Fogg & Powers LLC (57) ABSTRACT

A vehicle location accuracy enhancement system is provided. A digital active phased array radar is configured to generate a profiled terrain including terrain altitude information. A controller is configured to implement operating instructions in memory to conduct profile matching between the generated profiled terrain from the at least one digital active phased array radar and terrain altitude profile information in a terrain database to determine profiled location solutions. The controller is further configured to at least augment sensor location solutions from at least one other location determining system, including a GNSS, with the profiled location solutions to enhance accuracy of the sensor location solutions. The controller is also configured to determine location errors in the GNSS based on the profiled location solution and to broadcast the determined location errors.

19 Claims, 5 Drawing Sheets

(51) Int. Cl.
*G01S 13/86* (2006.01)
*G01S 13/89* (2006.01)
*G01S 13/935* (2020.01)
*G01S 19/40* (2010.01)
*G01S 19/47* (2010.01)

(52) U.S. Cl.
CPC .............. *G01S 19/40* (2013.01); *G01S 19/47* (2013.01); *G01S 2013/0254* (2013.01)

(56) References Cited

U.S. PATENT DOCUMENTS

| | | | |
|---|---|---|---|
| 7,352,292 | B2 | 4/2008 | Alter et al. |
| 7,409,293 | B2 | 8/2008 | Hager et al. |
| 8,160,758 | B2 | 4/2012 | Call et al. |
| 8,296,056 | B2 | 10/2012 | Becker et al. |
| 9,110,170 | B1* | 8/2015 | Woollard ................. G01S 13/89 |
| 9,720,082 | B1* | 8/2017 | Dana ........................ G01S 7/062 |
| 10,527,720 | B2 | 1/2020 | Apker et al. |
| 10,775,473 | B2 | 9/2020 | Malkes et al. |
| 2006/0158350 | A1* | 7/2006 | Glover .................. G05D 1/106 340/963 |
| 2012/0092208 | A1 | 4/2012 | LeMire et al. |
| 2015/0361642 | A1* | 12/2015 | Stratton .................. G06F 16/29 701/461 |
| 2016/0293019 | A1 | 10/2016 | Kim et al. |
| 2016/0364990 | A1 | 12/2016 | Khaghani et al. |
| 2017/0001732 | A1* | 1/2017 | Lim ..................... G05D 1/0684 701/461 |
| 2017/0015317 | A1* | 1/2017 | Fasola .................. G01C 21/165 |
| 2018/0240349 | A1* | 8/2018 | Laine .................... G08G 5/0047 |
| 2019/0075539 | A1* | 3/2019 | Zinn ........................ G01S 5/009 |
| 2019/0331758 | A1* | 10/2019 | Malkes ................. G01S 7/4004 |
| 2020/0025571 | A1* | 1/2020 | Skilton ............. G01C 21/1652 |
| 2020/0370920 | A1* | 11/2020 | Ahmed ................. G01S 13/582 |
| 2021/0247188 | A1* | 8/2021 | Ollagnier ............... G01C 23/00 |
| 2022/0172628 | A1* | 6/2022 | Sweeney .............. G08G 5/0078 |

OTHER PUBLICATIONS

Alberi et al., "Accuracy of Flight Altitude Measured with Low-Cost GNSS, Radar and Barometer Sensors: Implications for Airborne Radiometric Sensors", Sensors 2017, 17, 1889, pp. 1 through 21, MDPI, www.mdpi.com/journal/sensors.

Balamurugan et al., "Survey on UAV Navigation in GPS Denied Environments", International Conference on Signal Processing, Communication, Power and Embedded System (SCOPES)—2016, 2016, pp. 198 through 204, IEEE.

Fernandez, "Performance Based Navigation (PBN) National Airspace System (NAS) Navigation Strategy 2016-2030", Aeronautical Charting Forum, Apr. 27, 2016, pp. 1 through 15, Federal Aviation Administration.

European Patent Office, "Extended European Search Report", from EP Application No. 21218084.8, from Foreign Counterpart to U.S. Appl. No. 17/190,675, filed May 25, 2022, pp. 1 through 25, Published: EP.

* cited by examiner

VEHICLE LOCATION ACCURACY ENHANCEMENT SYSTEM

This Application claims priority to India Provisional Patent Application Serial No. 202111001201, same title herewith, filed on Jan. 11, 2021, which is incorporated in its entirety herein by reference.

BACKGROUND

As vehicle operations becomes more and more automated, having an accurate determination of a vehicle's current location is critical for safe vehicle operation. An example of a location determining system used to determine location is a Global Navigation Satellite System (GNSS) which includes the Global Positioning System (GPS). The GPS includes a plurality of satellites that generates satellite signals sensed by a GPS receiver at the vehicle. The GPS receiver determines location of the vehicle based on the signals received from the plurality of satellites. Another example of a location determining system used to determine a location of vehicle is an inertial navigation system (INS). An INS uses motion sensors and rotational sensors that may be used in dead reckoning to determine location. Another possible vehicle location determining system is with the use of 5G networks. 5G location determining systems have particular applicability for Unmanned Aircraft Systems (UAS) such as Urban Air Mobility (UAM) or Unmanned Aerial Vehicles (UAV).

Location determining systems may have limitations on accuracy based on operating conditions, errors in data used by the system or limitations of devices used in the system. Hence, systems that enhance the accuracy of location solutions provided by location determining systems are desired.

SUMMARY

The following summary is made by way of example and not by way of limitation. It is merely provided to aid the reader in understanding some of the aspects of the subject matter described. Embodiments provide the use of profiled location solutions generated by comparing a terrain profile generated with a digital active phased array radar system to a terrain database. Embodiments use the profiled location solutions to augment other location solutions, calibrate other location determining systems, update terrain databases, determine patterns to enhance accuracy, generate alternate waypoints for travel, etc.

In one embodiment, a vehicle location accuracy enhancement system is provided. The system includes at least one location determining system, at least one digital active phased array radar, at least one memory and at least one controller. The at least one location determining system is configured to generate sensor location solutions. The at least one digital active phased array radar is configured to generate a profiled terrain including terrain altitude information. The at least one memory is used to store at least a terrain database and operating instructions. The at least one controller is in communication with the at least one location determining system, the at least one digital active phased array radar and the at least one memory. The at least one controller is configured to implement the operating instructions in the memory to conduct profile matching between the generated profiled terrain from the at least one digital active phased array radar and terrain altitude profile information in the terrain database to determine profiled location solutions. The at least one controller is further configured to at least augment sensor location solutions from the at least one location determining system with the profiled location solutions to enhance accuracy of the sensor location solutions. Further the at least one location determining system includes a global navigation satellite system (GNSS). The at least one controller is configured to determine location errors in the GNSS based on the profiled location solution and to broadcast the determined location errors.

In another example embodiment, a method of enhancing an accuracy of a vehicle location determining system is provided. The method includes generating a profiled terrain using a digital active phased array radar that includes altitude information; comparing the profiled terrain with terrain altitude information in a terrain database; determining a profiled location solution when a match is found between the profiled terrain and terrain altitude information in the terrain database; comparing the profiled location solution with at least a sensor location solution from a global navigation satellite system (GNSS) receiver; determining if location errors are present in the sensor location solution from the GNSS receiver based on the comparison of the profile location solution with the sensor location solution from the GNSS receiver; and broadcasting determined location errors.

In yet another embodiment, another method of enhancing an accuracy of a vehicle location determining system is provided. The method includes generating a profiled terrain with the digital active phased array that includes altitude information; monitoring altitude solutions in the profiled terrain for terrain profile variations; and generating alternative waypoints for vehicle travel when the altitude information in the profiled terrain does not provide enough profile variations to distinguish a current vehicle location when matching the profiled terrain with terrain altitude information in a terrain database.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Systems to determine a current location of a vehicle may use more than one location determining system to help correct for possible errors in one system or provide a backup location solution when a primary location determining solution is not available. For example, GPS may have errors which may contribute to drift in an assigned travel path. Another location system may be used to correct or reduced the drift error in a location solution determined at a GPS receiver. In a UAM/UAV example, a 5G location determining system may be a primary location determining system or a primary location accuracy determining system. If a failure occurs in any 5G link or GPS, a location solution from an INS receiver may not be enough for accurate navigation and landing of the UAM/UAV.

Embodiments provide a vehicle location accuracy enhancement system that supplements and enhances location determining systems, such as but not limited to GNSS, INS, 5G systems etc., using a Digital Active Phased Array (DAPA) radar system and terrain database to provide additional information that can be used as a location solution. This generated profiled location solution may be used, for navigation and to enhance or even calibrate existing location determining systems. A DAPA is a phased array radar design with electronically steered beams to detect objects, such as terrain. One DAPA can provide 120 degrees of coverage in an azimuth direction. 360 degrees of coverage may be obtained with multiple DAPA installations. In one example embodiment, the vehicle location accuracy enhancement system is used at least in part to broadcast determined location (position) errors in the GNSS for use by other location determining systems in other vehicles. Embodiments may be used in any type of air, space, land and water vehicle needing to determine position/location of the vehicle.

In some embodiments, a terrain database is constructed with GPS(/INS) altitude, latitude, longitude and DAPA altitude in real time. Additionally, embodiments provide a confidence level to altitude profile information in the database to ensure accurate altitude profile matching.

Figure 1:
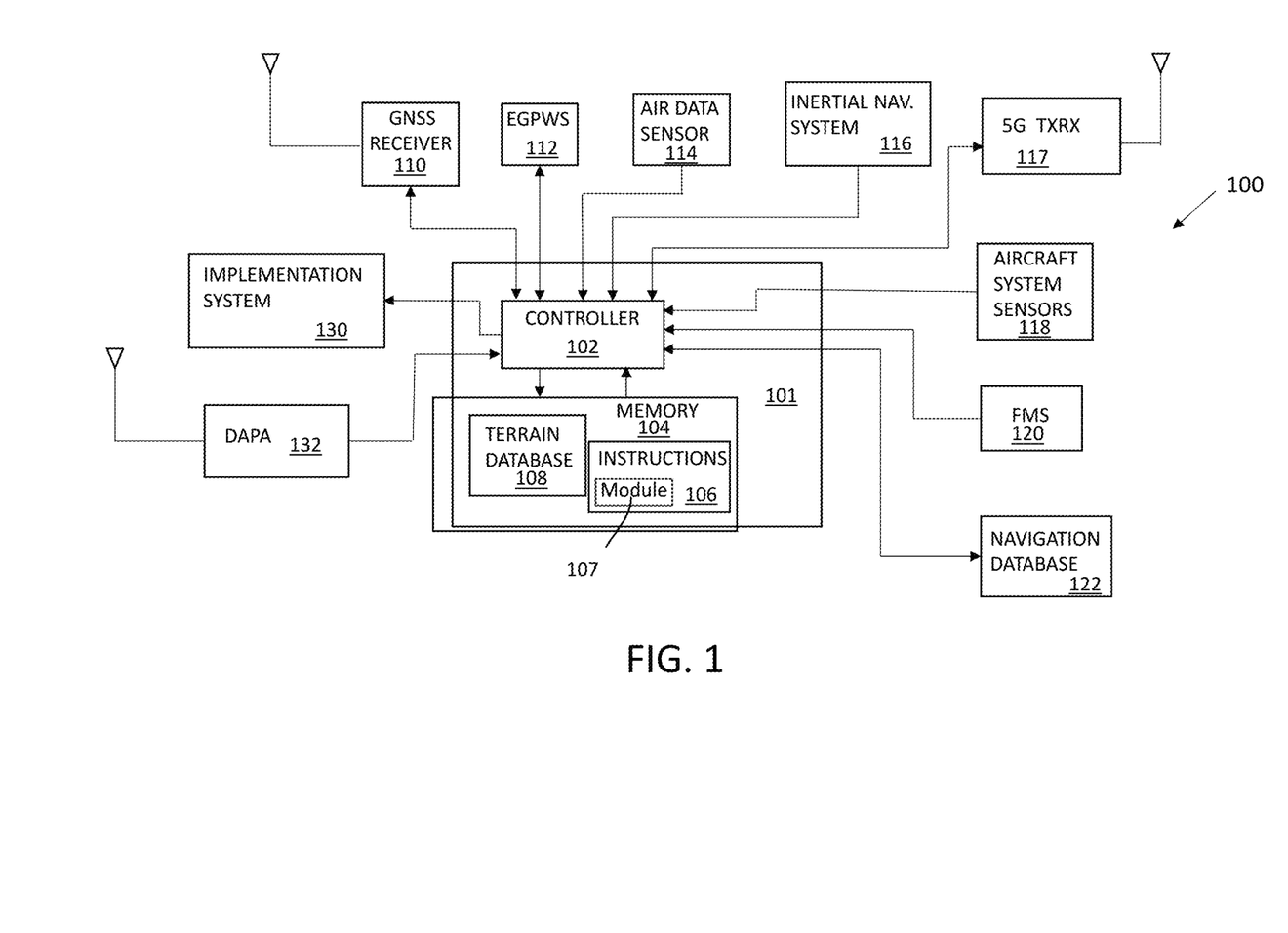
FIG. 1 is a block diagram of a vehicle location accuracy enhancement system according to one exemplary embodiment.

Referring to FIG. 1 an example of a vehicle location accuracy enhancement system 100 is illustrated. The vehicle location accuracy enhancement system 100 includes a control system 101. The control system 101 includes at least one controller 102 and at least one memory 104. In general, the controller 102 (or at least one controller 102) may include any one or more of a processor, microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller 102 may be part of a system controller or a component controller. At least one memory 104 may include computer-readable operating instructions 106 that, when executed by the controller 102, provides functions of the vehicle location accuracy enhancement system 100. Such functions may include the functions of using a digital active phased array (DAPA) radar 132 and terrain database 108 to determine profiled location solutions as described below. The computer readable instructions may be encoded within the memory 104. The memory 104 may be an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The controller 102 is in communication with a plurality sensors and systems of the vehicle. For example, FIG. 1 illustrates a GNSS receiver 110 that is in communication with the controller 102. The GNSS receiver 110 is designed to receive satellite signals from a plurality of the satellites. In an example embodiment, the GNSS receiver 110 is configured to determine location solutions based on the received satellite signals and communicate the determined location solutions of the vehicle to the controller 102.

Also illustrated in FIG. 1 is an Enhanced Ground Proximity Warning System (EGPW) 112, Air Data Sensor 114, an Inertial Navigation System (INS) 116, a 5G receiver, aircraft system sensors 118, Flight Management System (FMS) 120 and a navigation database 122 which are all in communication with the controller 102. The system sensors 118 may include any number of different type of sensors for systems such as, but not limited to, barometric sensors, weight on wheel sensors, as well as sensors for different types of landing systems such a Microwave Landing Systems ((MLS) and Ground Based Augmentation System Landing systems (GLS). A 5G transceiver 117 may be a 5G system that determines locations used by the controller 102. In one example embodiment, the 5G transceiver 117 is part of a 5G position determining system with the controller 102 that implements location determining instructions 106 in the memory 104.

A DAPA is also in communication with the controller 102. The DAPA 132 provides radar image profiles of terrain (profiled terrain) that include altitudes information. The profiled terrain is compared with terrain information in a terrain database 108 to determine a location (or position) of the vehicle based on the instructions 106 implemented by the controller 102. The terrain database 108 may include location information, such as longitude and latitude information and altitudes at location with which a terrain profile may be compared to determine a location solution. FIG. 1 also illustrates an implementation system 130. The implementation system 130 may include a readout device to display a determined location. The implementation system 130 may include an automated vehicle control system that controls operation of the vehicle based at least in part on generated location solutions. Further the implementation system 130 may include a communication system to broadcast GNSS errors as discussed further in detail below.

The EGPWS 112 is a Terrain Awareness and Alerting system that provides terrain alerting and display functions with additional features. The EGPWS 112 uses aircraft input include geographic position, attitude, altitude, ground speed, vertical speed and glideslope deviation. These inputs are used with internal terrain, obstacles, and terrain databases to predict a potential conflict between an aircraft flight path and terrain or an obstacle. A terrain or obstacle conflict may result in the EGPWS 112 providing a visual and audio caution or warning alert.

The instructions 106 stored in the at least one memory 104 include a predicting and detecting module 107. These instructions implemented by the controller 102 provide predictive vehicle location accuracy and detect failures during navigation. Timely detections of GPS, INS failures are accomplished by determining, on some continuous basis, whether a data point based on the comparison of location solutions falls outside a set of bounds in an embodiment. If the data points fall outside the set bounds, they are flagged as an anomaly and reported in an example embodiment. Further in embodiments, the then current data is analyzed in real-time.

Further in an embodiment, the module instructions direct the controller 102 to find patterns that can help predicting location accuracy and prevent failures. The instructions take into consideration dynamic behavioral patterns of the contextual data relating to the vehicle's navigation and data from at least the GNSS Receiver 110, the INS 116, the terrain database 108, the 5G transceiver 117 information relating to location solutions. The input data trains or enables machine learning algorithms provided by the module 107 to detect anomalies and make decisions on which single or multiple inputs to use to provide the most accurate navigation solution. In one example embodiment, the instructions in the module implement regressive models that perform the predictions and help decide which of the sensor inputs can be blended to give optimal location accuracy at any moment of time. Further, by usage of few way points (terrain/obstacle data with significant height variation) from the terrain database 108 and comparing with DAPA radio altimeter altitude data, an altitude profile based on the terrain data can be determined.

Figure 2:
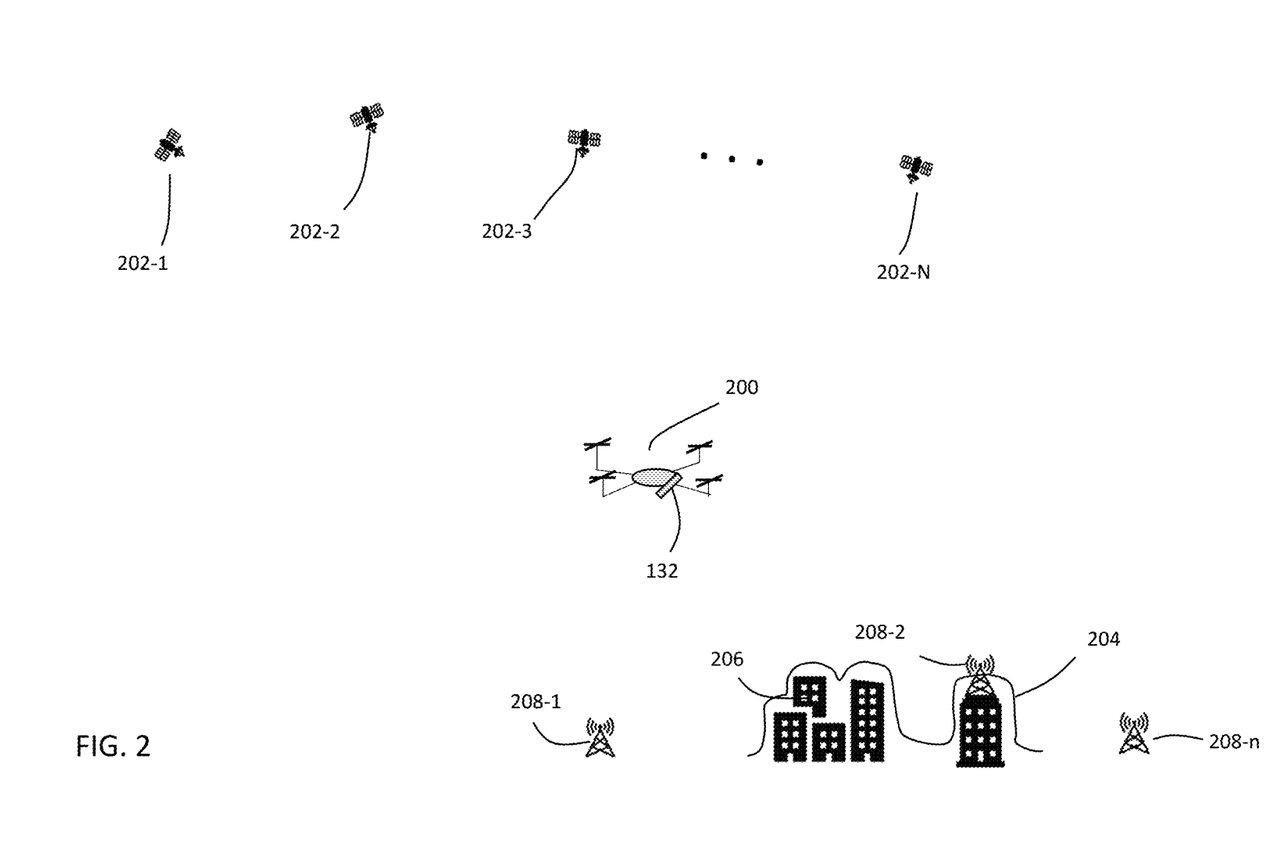
FIG. 2 is an illustration of a vehicle location accuracy enhancement system in use according to one exemplary embodiment.

In FIG. 2, an example of the vehicle location accuracy enhancement system 100 integrated into a vehicle 200 is provided. In this example the vehicle is a UAM/UAV but any type of vehicle that needs to determine the vehicles current location may implement the vehicle location accuracy enhancement system 100. The vehicle is illustrated as including the DAPA 132 that is used to generate a profiled terrain 204 of terrain 206 that is compared to terrain in the terrain database 108 to determine a location solution of the vehicle that can be compared against other sensor location solutions from other sensor location determining systems, such as, but not limited to, a GNSS and 5G system, utilized by the vehicle 200. Also illustrated in FIG. 2 is a plurality of satellites 102-1 through 202-*n* and a plurality of 5G antennas respectively used by the GNSS receiver 110 and the 5G receiver of the vehicle location accuracy enhancement system 100.

Figure 3:
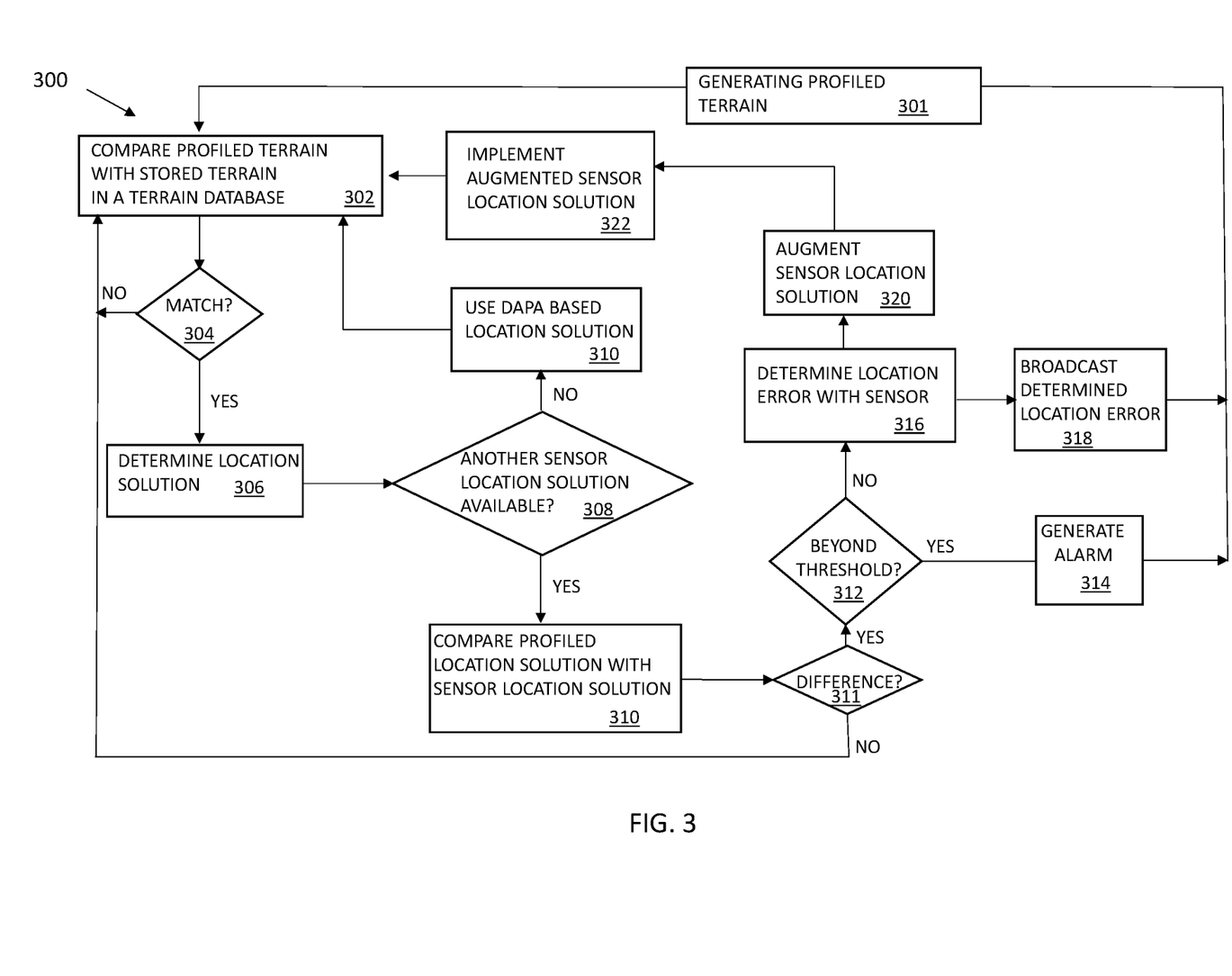
FIG. 3 is a vehicle location accuracy enhancement system flow diagram according to one exemplary embodiment.

Referring to FIG. 3, a vehicle location accuracy enhancement system flow diagram 300 of an example embodiment is illustrated. The vehicle location accuracy enhancement system flow diagram 300 is provided as series of sequential blocks. The sequence of the block may be different in other embodiments and may even occur in parallel with each other. Hence, embodiments are not limited to the sequence of blocks set out in FIG. 3.

The process of the vehicle location accuracy enhancement system flow diagram 300 starts at block (301) where a profiled terrain 204 is generated using a digital active phased array radar that includes altitude information. At block (302) the profiled terrain 204 using the DAPA 132 is compared to stored terrain altitude information in the terrain database 108. If there is no match detected at block (304), the process continues at block (302) comparing the profiled terrain 204 with the stored terrain in the terrain database 108. If there is a match detected at block (304), a location or location solution of the vehicle based on the match is determined at block (306).

It is then determined if there is another location solution available from another location determining system at block (308). If there is not another location solution available, the system uses the location solution determined by the DAPA at block (310). This situation may occur when other location determining systems are not working. In this situation, the profiled location solution derived from the DAPA 132 is used. The process then continues at block (302) comparing the profiled terrain 204 with the stored terrain in the terrain database 108.

If another location solution is available at block (308), the DAPA based location solution (profiled location solution) is compared with the sensor location solution at block (310). It is then determined if there is a difference between the profiled location solution and the sensor location solution at block (311). If there is no difference, the process continues at block (312). In one example embodiment, if there is a difference, it is then determined if the difference is beyond a defined threshold limit at block (312). If the difference is beyond the defined threshold at block (312), an alarm is generated at block (314) and the process continues at block (302). If it is determined at block (312) that the difference is not beyond the defined threshold, a location error with an associated sensor location determining system is determined at block (316).

In one embodiment, a broadcast of the determined location error is provided at block (318). This allows for location determining systems in other vehicles to have notice of the location error with data associate with a location determining system such as, for example, with data in signals in the GNSS receiver 110. The process then continues at block (302). Further, the sensor location solution may be augmented at block (320) based on the profiled location solution to provide a more accurate location solution. The augmented sensor location solution determined at block (320) may then be implemented at block (322). Examples of the implementation include, but are not limited to, using the augmented sensor location solution to display a determined location (position), using the augmented sensor location solution in an automated vehicle control system to control operation of the vehicle, etc. The process then continues a block (302) in this example embodiment.

Figure 4:
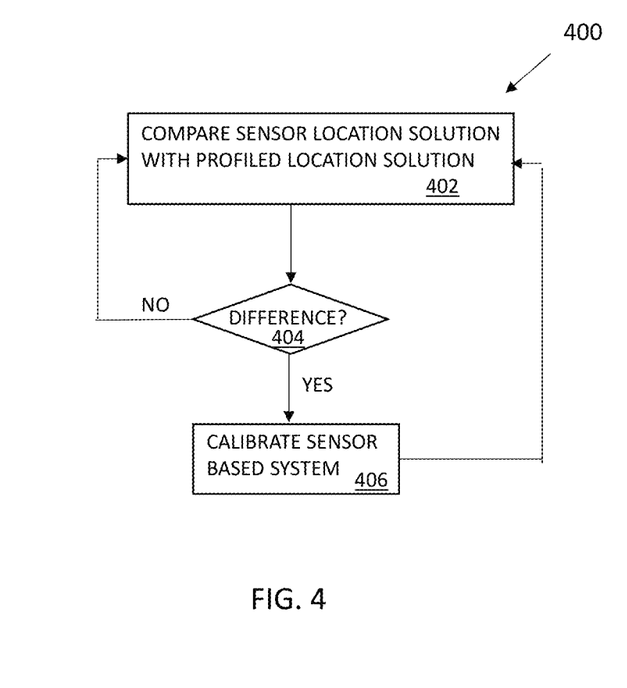
FIG. 4 is a calibrate sensor flow diagram according to one exemplary embodiment.
Figure 5:
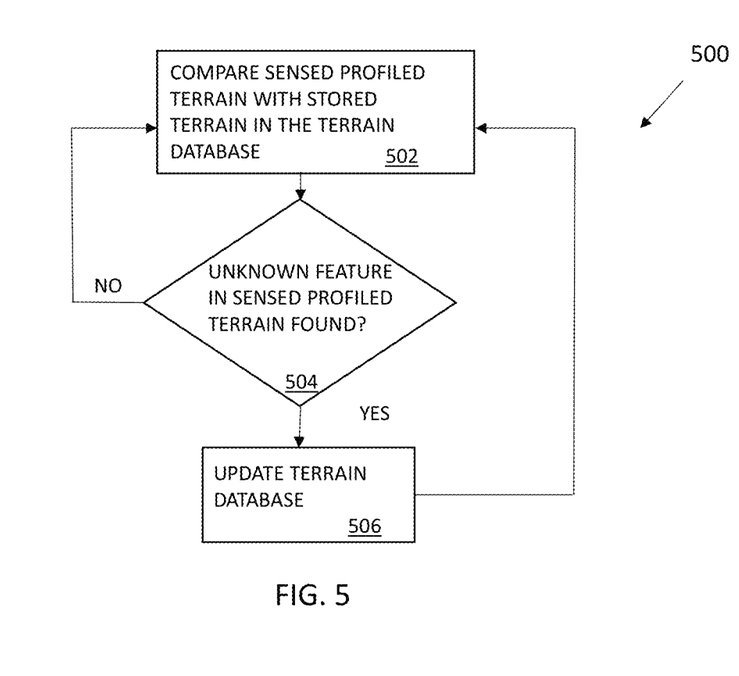
FIG. 5 is an update terrain flow diagram according to one exemplary embodiment.
Figure 6:
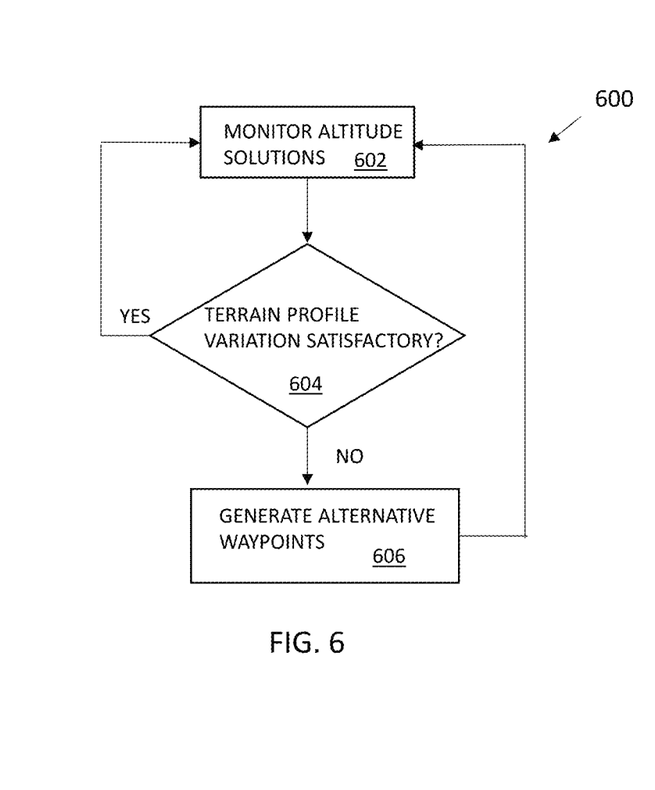
FIG. 6 is an alternative waypoint flow diagram according to one exemplary embodiment.
Figure 7:
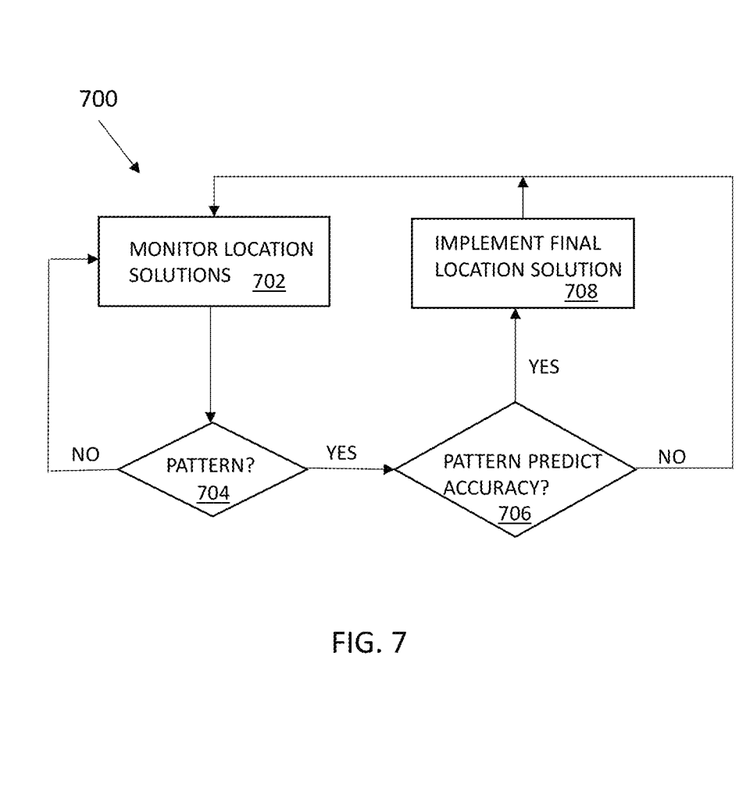
FIG. 7 is pattern implemented flow diagram according to one exemplary embodiment.

Other examples of implementing terrain location solutions are illustrated in a calibrate sensor flow diagram 400 of FIG. 4, an update terrain flow diagram 500 of FIG. 5, an alternative waypoint flow diagram 600 of FIG. 6 and in a pattern implemented flow diagram 700 of FIG. 7. Each of the flow diagrams 400, 500, 600 and 700 are illustrated as a series of sequential blocks. The sequence of the block may occur in a different order or in parallel in other embodiments. Hence, embodiments are not limited to sequential order illustrated in the flow diagrams.

Referring to FIG. 4, the calibrate sensor flow diagram 400 example is illustrated. In this process, a sensor location solution from one or more sensor location determining systems are compared with the DAPA location solution at block (402). If it is determined there is no difference at block (404), the process continues comparing the sensor location solution with the DAPA location solution at block (402). If it is determined there is a difference at block (404), the system that generated the sensor location solution is calibrated at block (406). Calibration may include adjusting an output of a location determining system to match the profile location solution from the DAPA system. The process then continues comparing the sensor location solution with the profiled location solution at block (402). The calibrate sensor flow diagram 400 may be used to calibrate any system providing information used in generating a location solution, such as but not limited to, the GNSS receiver 110, the 5G transceiver 117, the INS 116 etc.

The update terrain flow diagram 500 example of FIG. 5 starts by comparing the sensed profiled terrain 204 using the DAPA 132 with the stored terrain in the terrain database 108 at block (502). It is determined at block (504), if any features in the sensed profiled terrain 204 do not correspond to features in the stored terrain. This could occur if the terrain, such as a city in an example, changes over time with the construction and removal of buildings. If it is determined at block (504) that no unknown features are found with the profile terrain the process continues at block (502) comparing the sensed profiled terrain 204 using the DAPA 132 with the stored terrain in the terrain database 108. If one or more unknown features have been found in a then current profiled terrain 204, the terrain database 108 is updated to include the one or more unknown features at block (506). This method may also be used to remove features from the terrain database 108 that are no longer present in a then current profiled terrain 204. The process then continues at block (502) comparing a then current profiled terrain 204 using the DAPA 132 with the stored terrain in the terrain database 108. In one example embodiment, one of the other systems used to provide a location solution may be used to confirm the location of the system generating the sensed profiled terrain 204 when a feature is added or removed.

The alternative waypoint flow diagram 600 of FIG. 6 illustrates one way of providing alternate waypoints, in an example embodiment, when a variation in altitude of features in a profiled terrain 204 is not adequate to distinguish a location from other locations. The process starts by monitoring altitude solutions in the sensed profiled terrain 204 at block (602). It is determined at block (604) if there is a satisfactory amount of altitude variation in the profiled terrain 204. If it is determined at block (604) there is a satisfactory amount of variation in altitude solutions, the process continues monitoring at block (602). If, however, it is determined at block (604) that there is not sufficient variation in altitude in a profiled terrain 204, alternative waypoints are generated at block (606). The alternative waypoints may be used by the vehicle to plot a different travel path that will take the vehicle over terrain that will produce a profiled terrain 204 with sufficient altitude deviations to ensure the sensed profiled terrain 204 is unique enough that when a match is found with stored profiles in the terrain database 108, a determined location of the vehicle can be relied upon.

The pattern implemented flow diagram 700 of FIG. 7 provides an example system that analyses real-time data to find patterns that may help predict location (position) accuracy and prevent failures. The process begins at block (702) monitoring location solutions. These are the location solutions from all of the location determining systems of the vehicle including the DAPA generated profiled location solution. It is determined at block (704) if any patterns can be detected from the different location solutions. If no pattern is detected at block (704), the process continues at block (702). If it is determined at block (704) that a pattern is present, it is then determined at block (706) if the pattern can be used to predict accuracy at block (706). If it cannot be used to determine accuracy, the process continues at block (702) monitoring location solutions. If it is, however, determined at block (706) the pattern can predict accuracy, the controller uses information from the pattern to provide a final location solution at block (708) and the process continues at block (702). In this example, the then current data, including the then current location solutions from the different location determining systems, is passed to the controller 102 which analyzes the real-time data and finds pattern that can help predicting location accuracy and prevent failures.

In one example embodiment, the controller 102, implementing the predicting and detecting module 107 of the instructions in memory 104, takes into consideration dynamic behavioral patterns of the contextual data relating to the vehicle's navigation and data from GPS, INS, Terrain DB, 5G cell information, etc. If, for example, the pattern indicates one of the location determining systems is providing location information during certain conditions that is not as accurate as other systems providing location information during those conditions, information from the one location determining system will not be used to provide a final location solution when the condition is experienced. Further, is some embodiments, input data from systems relating to location enables the controller 102, implementing the instructions in the module 107, to detect anomalies and make determinations on which single or multiple inputs will provide a more accurate navigation location based patterns detected in various earlier data feeds (machine learning). In some embodiments, the instructions implemented by the controller include regression models that generate predictions and help decide which of the sensor inputs should be blended to give optimal location accuracy at any moment of time. By deploying the machine learning, an artificial intelligence implemented by the controller 102 based on the instructions in the module 107 may be built into the system in such a way that an altitude profile can be predicted and the expected altitude profile can be checked with real-time DAPA radar altimeter altitude data to compute the then current location. In one embodiment, when a current profiled terrain 204 is not available, learned information from the determined patterns from earlier data feeds are used to augment current sensor location solutions.

Example Embodiments

Example 1 is a vehicle location accuracy enhancement system. The system includes at least one location determining system, at least one digital active phased array radar, at least one memory and at least one controller. The at least one location determining system is configured to generate sensor location solutions. The at least one digital active phased array radar is configured to generate a profiled terrain, the profiled terrain including altitude information. The at least one memory is used to store at least a terrain database and operating instructions. The at least one controller is in communication with the at least one location determining system, the at least one digital active phased array radar and the at least one memory. The at least one controller is configured to implement the operating instructions in the memory to conduct profile matching between the generated profiled terrain from the at least one digital active phased array radar and terrain altitude profile information in the terrain database to determine profiled location solutions. The at least one controller is further configured to at least augment sensor location solutions from the at least one location determining system with the profiled location solutions to enhance accuracy of the sensor location solutions.

Further the at least one location determining system includes a global navigation satellite system (GNSS). The at least one controller is configured to determine location errors in the GNSS based on the profiled location solution and to broadcast the determined location errors.

Example 2 includes the system of Example 1, wherein the at least one controller is further configured to use the profiled location solutions for navigation when sensor location solutions from the at least one location determining system is not available.

Example 3 includes the system of any of the Examples 1-2, wherein the at least one location determining system further includes one of an inertial navigation system, a 5G positioning system and an enhanced ground proximity warning system.

Example 4 includes the system of Example 3, wherein the at least one controller is further configured calibrate the inertial navigation system based at least in part on the profiled location solutions.

Example 5 includes the system of and of the Examples 1-4, wherein the broadcast determined location errors in the GNSS are used in at least one other vehicle to augment a sensor location solution from a GNSS receiver of the at least one other vehicle.

Example 6 includes the system of any of the Examples 1-5, wherein the vehicle is one of an air vehicle, a land vehicle and a water vehicle.

Example 7 includes the system of any of the Examples 1-6, wherein the profiled terrain generated from the digital active phased array radar includes a profiled terrain within a forward looking range of the digital active phased array radar.

Example 8 includes the system of any of the Examples 1-7, wherein the at least one controller is further configured to at least one of construct and enhance the terrain database using at least one of the profiled terrain from the digital active phased array radar system and location information from the at least one location determining system.

Example 9 includes the system of any of the Examples 1-8, further wherein the at least one controller is configured to generate a mismatch alarm signal when a sensor location solution generated from the at least one location determining system and a profiled location solution generated from the digital active phased array radar system have a difference greater than a select threshold.

Example 10 includes the system of any of the Examples 1-9, further wherein the at least one controller is configured to predict alternative waypoints if a profiled terrain is not in an order of satisfactory variation to provide an accurate profiled location solution.

Example 11 includes the system of any of the Examples 1-10, wherein the at least one controller is further configured to analyze in real time the profiled location solutions and the sensor location solutions to determine patterns that predict location accuracy and when a current profiled terrain from the digital active phased array radar is not available, using learned information from the determined patterns to augment current sensor location solutions.

Example 12 includes a method of enhancing an accuracy of a vehicle location determining system. The method includes generating profiled terrain using a digital active phased array radar that includes altitude information; comparing the profiled terrain with terrain altitude information in a terrain database; determining a profiled location solution when a match is found between the profiled terrain and terrain altitude information in the terrain database; comparing the profiled location solution with at least a sensor location solution from a global navigation satellite system (GNSS) receiver; determining if location errors are present in the sensor location solution from the GNSS receiver based on the comparison of the profile location solution with the sensor location solution from the GNSS receiver; and broadcasting determined location errors.

Example 13 includes the method of Example 12, further including augmenting the sensor location solution based on the profiled location solution.

Example 14 includes the method of any of the Examples 12-13, further including calibrating the GNSS receiver based on the profiled location solution.

Example 15 includes the method of any of the Examples 12-14, further including generating at least one more sensor location solution from another location determining system; monitoring for patterns in the sensor location solutions and the profile location solution; and using determined patterns to generate augmented location solutions.

Example 16 includes the method of any of the Examples 12-15, further including determining if a feature detected in the profiled terrain is different in the terrain database; and updating the terrain database to account for the feature.

Example 17 includes a method of enhancing an accuracy of a vehicle location determining system, the method includes generating a profiled terrain with the digital active phased array that includes altitude information; monitoring altitude solutions in the profiled terrain for terrain profile variations; and generating alternative waypoints for vehicle travel when the altitude information in the profiled terrain does not provide enough profile variations to distinguish a current vehicle location when matching the profiled terrain with terrain altitude information in a terrain database.

Example 18 includes the method of Example 17, further including comparing the profiled terrain with the terrain altitude information in the terrain database when the profile variations in the profiled terrain provides enough altitude information to distinguish a current vehicle location when matching the profiled terrain with terrain altitude information in a terrain database; determining a profiled location solution when a match is found between profiled terrain and the terrain altitude information in the terrain database; comparing the determined profiled location solution with at least one sensor location solution from at least one location determining system; and augmenting the at least one sensor location solution based on the profiled location solution.

Example 19 includes the method of any of the Examples 17-18, further including comparing the profiled terrain with the terrain altitude information in the terrain database when the profile variations in the profiled terrain provides enough altitude information to distinguish a current vehicle location when matching the profiled terrain with terrain altitude information in a terrain database; determining a profiled location solution when a match is found between the profiled terrain and the terrain altitude information in the terrain database; comparing the profiled location solution with at least a sensor location solution from a global navigation satellite system (GNSS) receiver; determining if location errors are present in the sensor location solution from the GNSS receiver based on the comparison of the profile location solution with the sensor location solution from the GNSS receiver; and broadcasting determined location errors.

Example 20 includes the method of any of the Examples 17-19, further including comparing the profiled terrain with the terrain altitude information in the database when the profile variations in the profiled terrain provides enough altitude information to distinguish a current vehicle location when matching the profiled terrain with terrain altitude information in a terrain database; determining profiled location solutions when matches are found between the profiled terrain and the terrain altitude information in the terrain database; generating sensor location solutions from at least one location determining system; monitoring for patterns in the sensor location solutions and the profile location solutions; and using the determined patterns to generate augmented location solutions.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle location accuracy enhancement system, the system comprising:
   at least one location determining system configured to generate sensor location solutions;
   at least one digital active phased array radar configured to generate a profiled terrain including terrain altitude information;
   at least one memory to store at least a terrain database and operating instructions;
   at least one controller in communication with the at least one location determining system, the at least one digital active phased array radar and the at least one memory, the at least one controller configured to implement the operating instructions in the memory to conduct profile matching between the generated profiled terrain from the at least one digital active phased array radar and terrain altitude profile information in the terrain database to determine profiled location solutions, the at least one controller further configured to at least augment the sensor location solutions from the at least one location determining system with the profiled location solutions to enhance accuracy of the sensor location solutions; and
   wherein the at least one location determining system includes a global navigation satellite system (GNSS), the at least one controller is configured to determine location errors in the GNSS based on the profiled location solutions, the at least one controller further configured to broadcast the determined location errors.

2. The system of claim 1, wherein the at least one controller is further configured to use the profiled location solutions for navigation when the sensor location solutions from the at least one location determining system is not available.

3. The system of claim 1, wherein the at least one location determining system further includes one of an inertial navigation system, a 5G positioning system and an enhanced ground proximity warning system.

4. The system of claim 3, wherein the at least one controller is further configured calibrate the inertial navigation system based at least in part on the profiled location solutions.

5. The system of claim 1, wherein the broadcast determined location errors in the GNSS are used in at least one other vehicle to augment a sensor location solution from a GNSS receiver of the at least one other vehicle.

6. The system of claim 1, wherein the vehicle is one of an air vehicle, a land vehicle and a water vehicle.

7. The system of claim 1, wherein the profiled terrain generated from the digital active phased array radar includes a profiled terrain within a forward looking range of the digital active phased array radar.

8. The system of claim 1, wherein the at least one controller is further configured to at least one of construct and enhance the terrain database using at least one of the profiled terrain from the digital active phased array radar system and location information from the at least one location determining system.

9. The system of claim 1, further wherein the at least one controller is configured to generate a mismatch alarm signal when a sensor location solution generated from the at least one location determining system and a profiled location solution generated from the digital active phased array radar system have a difference greater than a select threshold.

10. The system of claim 1, further wherein the at least one controller is configured to predict alternative waypoints if a determined profiled terrain is not in an order of satisfactory variation to provide an accurate profiled location solution.

11. The system of claim 1, wherein the at least one controller is further configured to:
   analyze in real time the profiled location solutions and the sensor location solutions to determine patterns that predict location accuracy; and
   when a current profiled terrain from the digital active phased array radar is not available, using learned information from the determined patterns to augment current sensor location solutions.

12. A method of enhancing an accuracy of a vehicle location determining system, the method comprising:
   generating a profiled terrain using a digital active phased array radar that includes altitude information;
   comparing the profiled terrain with terrain altitude information in a terrain database;
   determining a profiled location solution when a match is found between the profiled terrain and terrain altitude information in the terrain database;
   comparing the profiled location solution with at least a sensor location solution from a global navigation satellite system (GNSS) receiver;
   determining if location errors are present in the sensor location solution from the GNSS receiver based on the comparison of the profiled location solution with the sensor location solution from the GNSS receiver; and
   broadcasting determined location errors.

13. The method of claim 12, further comprising:
   augmenting the sensor location solution based on the profiled location solution.

14. The method of claim 12, further comprising:
   calibrating the GNSS receiver based on the profiled location solution.

15. The method of claim 12, further comprising:
   generating at least one more sensor location solution from another location determining system;
   monitoring for patterns in the sensor location solutions and the profile location solution; and
   using determined patterns to generate augmented location solutions.

16. The method of claim 12, further comprising:
   determining if a feature detected in the profiled terrain is different in the terrain database; and
   updating the terrain database to account for the feature.

17. A method of enhancing an accuracy of a vehicle location determining system, the method comprising:
   generating a profiled terrain with a digital active phased array that includes altitude information;

monitoring altitude solutions in the profiled terrain for terrain profile variations;

comparing the profiled terrain with the terrain altitude information in the terrain database when the profile variations in the profiled terrain provides enough altitude information to distinguish a current vehicle location when matching the profiled terrain with terrain altitude information in the terrain database;

determining a profiled location solution when a match is found between the profiled terrain and the terrain altitude information in the terrain database;

comparing the profiled location solution with at least a sensor location solution from a global navigation satellite system (GNSS) receiver;

determining if location errors are present in the sensor location solution from the GNSS receiver based on the comparison of the profiled location solution with the sensor location solution from the GNSS receiver;

broadcasting determined location errors; and generating alternative waypoints for vehicle travel when altitude information in the profiled terrain does not provide enough profile variations to distinguish a current vehicle location when matching the profiled terrain with terrain altitude information in a terrain database.

18. The method of claim 17, further comprising:

augmenting the at least one sensor location solution based on the profiled location solution.

19. The method of claim 17, further comprising:

generating sensor location solutions from at least one location determining system monitoring for patterns in the sensor location solutions and the profile location solutions; and using the determined patterns to generate augmented location solutions.

\* \* \* \* \*